United States Patent
Wang

(10) Patent No.: US 12,386,596 B2
(45) Date of Patent: Aug. 12, 2025

(54) SELECTIVE STATIC CODE ANALYSIS FOR LARGE CODEBASES

(71) Applicant: SAP SE, Walldorf (DE)

(72) Inventor: Shunlai Wang, Beijing (CN)

(73) Assignee: SAP SE, Walldorf (DE)

( * ) Notice: Subject to any disclaimer, the term of this patent is extended or adjusted under 35 U.S.C. 154(b) by 137 days.

(21) Appl. No.: 18/137,836

(22) Filed: Apr. 21, 2023

(65) Prior Publication Data

US 2024/0354077 A1    Oct. 24, 2024

(51) Int. Cl.
*G06F 8/41* (2018.01)

(52) U.S. Cl.
CPC ...................... *G06F 8/42* (2013.01)

(58) Field of Classification Search
CPC ........................................... G06F 8/42
See application file for complete search history.

(56) References Cited

U.S. PATENT DOCUMENTS

| | | | | |
|---|---|---|---|---|
| 9,262,132 B1 * | 2/2016 | Lugton | ................... | G06F 8/433 |
| 2021/0117547 A1 * | 4/2021 | Roberts | ................. | G06F 21/577 |

FOREIGN PATENT DOCUMENTS

| | | | | |
|---|---|---|---|---|
| CN | 106354632 A | * | 1/2017 | ............ G06F 11/366 |
| CN | 107832059 B | * | 2/2021 | ............ G06F 8/433 |

OTHER PUBLICATIONS

Delev et al,. "Static analysis of source code written by novice programmers" (Year: 2017).*
Zampetti et al., "How Open Source Projects use Static Code Analysis Tools in Continuous Integration Pipelines" (Year: 2017).*
Zampett et al., "How Open Source Projects Use Static Code Analysis Tools in Continuous Integration Pipelines" (Year: 2017).*
Kannavara, "Securing Opensource Code via Static Analysis" (Year: 2012).*

* cited by examiner

*Primary Examiner* — Phillip H Nguyen
(74) *Attorney, Agent, or Firm* — Sterne, Kessler, Goldstein & Fox P.L.L.C.

(57) ABSTRACT

Embodiments are described for a system comprising a memory and at least one processor coupled to the memory. The at least one processor is configured to receive a plurality of files or metadata of the plurality of files and identify a subset of the plurality of files that requires static code analysis based on one or more characteristics of the subset of the plurality of files. The at least one processor is further configured to determine that one or more files of the subset of the plurality of files require compilation and compile the one or more files of the subset of the plurality of files. The at least one processor is further configured to perform the static code analysis on the complied the one or more files and other files of the subset of the plurality of files and return results of the static code analysis.

20 Claims, 6 Drawing Sheets

SELECTIVE STATIC CODE ANALYSIS FOR LARGE CODEBASES

BACKGROUND

A code analysis system can check whether a file contains one or more pieces of code that are in compliance with security rules or include any bugs. When serving codebases, especially large codebases, the code analysis system may receive files continuously and check them automatically. In some embodiments, it is time-consuming for the code analysis system to check all the files received.

SUMMARY

Some embodiments of this disclosure relate to apparatus, system, computer program product, and method embodiments for implementing a code analysis system.

Some embodiments of this disclosure provide a system comprising a memory and at least one processor coupled to the memory. The at least one processor is configured to receive a plurality of files or metadata of the plurality of files and identify a subset of the plurality of files that requires static code analysis based on one or more characteristics of the subset of the plurality of files. The at least one processor is further configured to determine that one or more files of the subset of the plurality of files require compilation and compile the one or more files of the subset of the plurality of files. The at least one processor is further configured to perform the static code analysis on the complied one or more files and other files of the subset of the plurality of files and return results of the static code analysis.

Some embodiments of this disclosure provide a method for analyzing a plurality of files. The method comprises receiving, by one or more computing devices, the plurality of files or metadata of the plurality of files and identifying, by the one or more computing devices, a subset of the plurality of files that requires static code analysis based on one or more characteristics of the subset of the plurality of files. The method further comprises determining that one or more files of the subset of the plurality of files require compilation and compiling the one or more files of the subset of the plurality of files. The method further comprises performing the static code analysis on the complied one or more files and other files of the subset of the plurality of files and returning results of the static code analysis.

Some embodiments of this disclosure provide a non-transitory computer-readable medium (CRM) comprising instructions to, when executed by at least one computing device, causes the at least one computing device to perform operations to analyze a plurality of files. The operations comprise receiving the plurality of files or metadata of the plurality of files and identifying a subset of the plurality of files that requires static code analysis based on one or more characteristics of the subset of the plurality of files. The operations further comprise determining that one or more files of the subset of the plurality of files require compilation and compiling the one or more files of the subset of the plurality of files. The operations further comprise performing the static code analysis on the complied one or more files and other files of the subset of the plurality of files and returning results of the static code analysis.

This Summary is provided merely for the purposes of illustrating some embodiments to provide an understanding of the subject matter described herein. Accordingly, the above-described features are merely examples and should not be construed to narrow the scope or spirit of the subject matter in this disclosure. Other features, embodiments, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
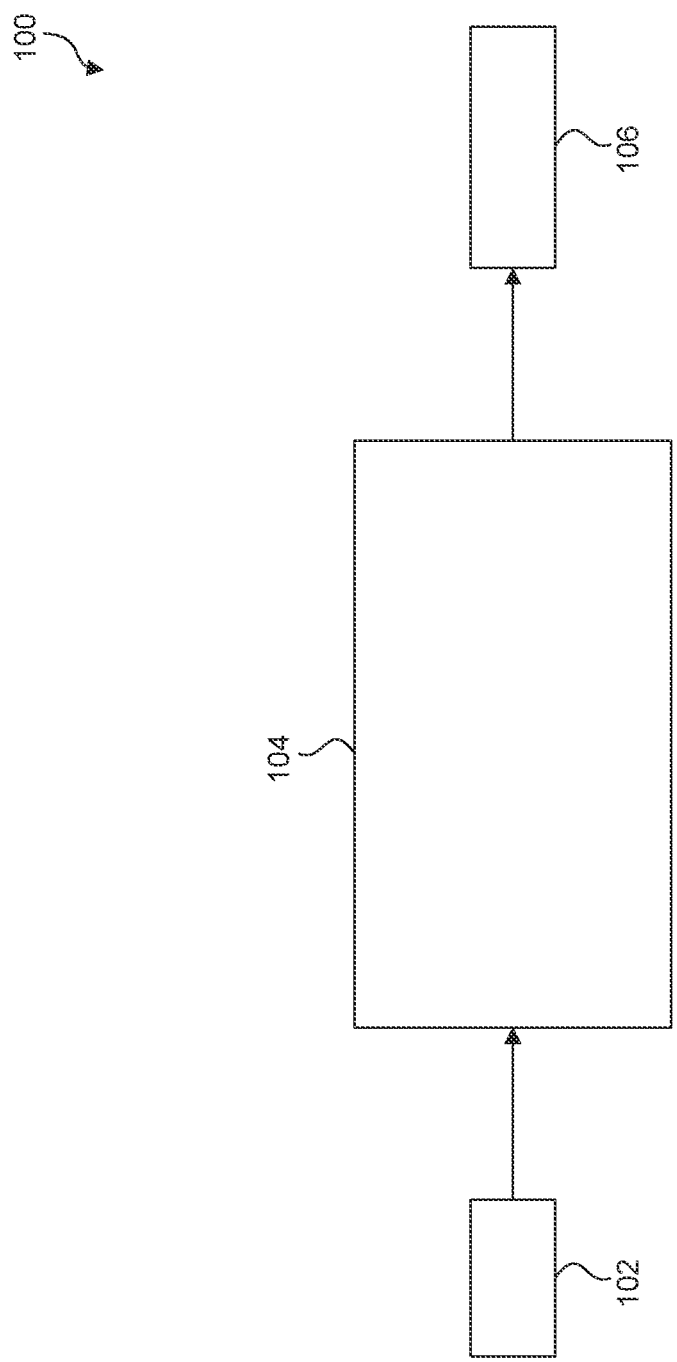
FIG. 1 illustrates an example system implementing a code analysis system, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatus, system, computer program product, and method embodiments for implementing a code analysis system.

In some embodiments, a code analysis system can scan a file for potential defects or security vulnerabilities via static code analysis. For example, the file may include one or more pieces of source codes. The code analysis system can perform the static code analysis by checking syntax, structures, and logic of the one or more pieces of source codes. In some embodiments, the code analysis system can identify errors in the one or more pieces of source codes that may lead to bugs, crashes, or security breaches. The code analysis system may also identify potential weaknesses even when the one or more pieces of source codes are error-free. In some embodiments, the code analysis system may check the file or the one or more pieces of source codes included in the file without actually executing the one or more pieces of source codes. In some embodiments, the code analysis system can be used during a development process. For example, when developing a software program, the code analysis system can check a newly developed file for potential defects or security vulnerabilities before moving to a next stage. The code analysis system can also check the file regularly as a part of ongoing maintenance efforts. In some embodiments, the code analysis system can check files in an IT infrastructure purchasing process.

In some embodiments, it is time-consuming for the code analysis system to scan a file. For example, the code analysis system may launch a scanner to check whether the file has potential defects or security vulnerabilities. Launching the scanner and scanning the file may take extensive time. In some embodiments, some files may require compilation before being scanned. For example, files that include codebases host programming languages, such as C, C++, and Objective-C, require compilation with a build wrapper before the code analysis system can scan. Accordingly, these files may require even more time to scan. Thus, scanning files may prolong development processes, maintenance processes, and/or IT infrastructure purchasing processes discussed above.

In some embodiments, not all files are required to be scanned. For example, text documents may not be required to be scanned. The text documents may include an article, an email record, or other text records that would not lead to bugs, crashes, or security breaches like source codes, thus does not require scanning. In such a case, when the code analysis system receives a plurality of files, the code analysis system can skip scanning the text documents in the plurality of files to save time. In some embodiments, the code analysis system can determine whether to skip scanning a file based on a type or a location of the file. For example, as discussed above, the code analysis system can determine that the file is a text document and then skip scanning the file. For another example, the code analysis system can determine that the file is stored in a source code directory and thus scan the file.

FIG. 1 illustrates an example system implementing a code analysis system, according to some embodiments of the disclosure. The example system 100 is provided for the purpose of illustration only and does not limit the disclosed embodiments. The example system 100 may include, but is not limited to, a source code management system 102, a code analysis system 104, and a target platform 106. The source code management system 102 may include, but is not limited to, laptops, desktops, personal computers, cloud servers, wireless communication devices, smartphones, tablets, personal assistants, monitors, televisions, wearable devices, Internet of Things (IoT) devices, vehicle communication devices, and the like. In some embodiments, the source code management system 102 may also include a git source code management (SCM). The code analysis system 104 may include, but is not limited to, computer systems, servers, cloud systems, cloud servers, laptops, desktops, personal computers, and the like. The target platform 106 may include, but is not limited to, computer systems, servers, cloud systems, cloud servers, laptops, desktops, personal computers, and the like. In some embodiments, the source code management system 102, the code analysis system 104, and the target platform 106 can be located in different hardware devices or a same hardware device. For example, the source code management system 102 may be located in a cloud server and connect with the code analysis system 104 via the Internet. For another example, the code analysis system 104 can be a server or a computer system in a software developing company or a service company and the target platform 106 can be a computer system in a client company. In some embodiments, the source code management system 102 can detect files that have changes in codebases and transmit the files to the code analysis system 104. In some embodiments, instead of transmitting the actual files, the source code management system 102 can also transmit a list of the files that have changes to the code analysis system 104. For example, the source code management system 102 can include directory and/or identifications of the file in the list and transmit the list to the code analysis system 104. This may avoid consuming network resources of transmitting the actual files. In some embodiments, the source code management system 102 can transmit files or a list of files regardless of changes. For example, the source code management system 102 can transmit files or a list of files that do not have any change to the code analysis system 104 for one time to perform a one-time code maintenance. The one-time code maintenance can be requested by a user. For example, the code management system 102 may receive a request from a user device or an instruction from the user to perform the one-time code maintenance. The request or the instruction may include a list of files to be checked and the source code management system 102 may transmit the list of files or the actual files on the list to the code analysis system 104 based on the request from the user equipment or the instruction from the user. The files on the list may include files that have no change. The source code management system 102 can also perform periodical code maintenance by transmitting files with or without changes to the code analysis system 104 regularly. In some embodiments, after receiving the file, the code analysis system 104 can transmit the file, with or without scanning depending on the type or the location of the file as discussed above, to the target platform 106 via the Internet or other communication media.

In some embodiments, the code analysis system 104 may also include a scanner. When the code analysis system 104 determines to scan the file, the code analysis system 104 can launch the scanner and scan the file. For example, the scanner can scan the file for potential defects or security vulnerabilities of the file via static code analysis. The scanner can perform the static code analysis by checking syntax, structures, and logic of the file. In some embodiments, the scanner can also locate outside the code analysis system 104. For example, the scanner can be hosted on a cloud server. When the code analysis system 104 determines to scan the file, the code analysis system 104 can transmit a request to scan the file to the cloud server and the cloud server can launch the scanner to scan the file.

In some embodiments, the code analysis system 104 may also include a cache storage. When the code analysis system 104 determines whether to scan the file, the code analysis system 104 may save a record of the determination. For example, the record can indicate that the file does not require scanning. In such a case, when the code analysis system 104 receives the file again, the code analysis system 104 can determine based on the record whether or not to scan the file. In some embodiments, the cache storage can be locally included the code analysis system 104 or hosted by another remotely located device or hosted by a cloud system. In such cases, the code analysis system 104 can retrieve one or more cached data that are associated with the file from the cache storage when receiving the file. The code analysis system 104 can then determine whether to scan the file based on the one or more cached data.

Figure 2:
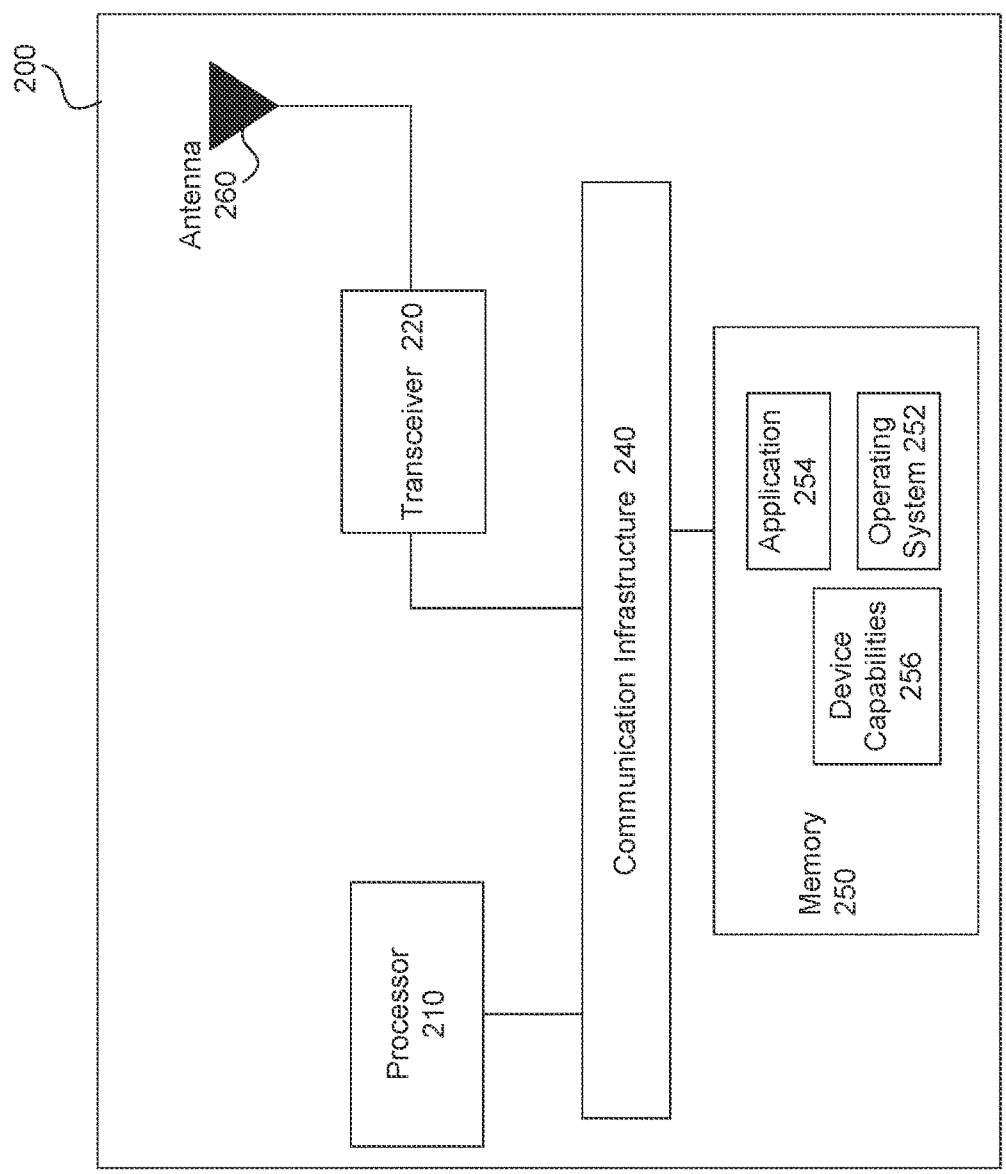
FIG. 2 illustrates a block diagram of an example system of a code analysis system, according to some embodiments of the disclosure.

FIG. 2 illustrates a block diagram of an electronic device 200 implementing a code analysis system, according to some embodiments of the disclosure. The electronic device 200 may be any of the electronic devices (e.g., the source code management system 102, the code analysis system 104, and the target platform 106 of FIG. 1) of the system 100. The electronic device 200 includes a processor 210, one or more transceivers 220, a communication infrastructure 240, a memory 250, an operating system 252, an application 254, device capabilities 256, and antenna 260. Illustrated systems are provided as exemplary parts of electronic device 200, and electronic device 200 may include other circuit(s) and subsystem(s). Also, although the systems of electronic device 200 are illustrated as separate components, the embodiments of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The application 254 may include functions such as, but not limited to, radio streaming, video streaming, remote control, and/or other user functions. In some embodiments, the device capabilities 256 may be stored in the memory 250.

The electronic device 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement mechanisms for code analysis procedure, as described herein. Alternatively, or additionally, the processor 210 can be "hard coded" to implement mechanisms for the code analysis procedure, as described herein.

The one or more transceivers 220 transmit and receive communications signals support mechanisms for the code analysis procedure. Additionally, the one or more transceivers 220 transmit and receive communications signals that support mechanisms for measuring communication link(s), generating and transmitting system information, and receiving the system information. According to some embodiments, the one or more transceivers 220 may be coupled to the antenna 260 to wirelessly transmit and receive the communication signals. The antenna 260 may include one or more antennas that may be the same or different types and can form one or more antenna ports. The one or more transceivers 220 allow electronic device 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some embodiments of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver. Additionally, the one or more the transceivers 220 may include one or more circuits (including a cellular transceiver) for connecting to and communicating on cellular networks.

As discussed in more detail below with respect to FIGS. 3-6, processor 210 may implement different mechanisms for the reference signal configuration procedure as discussed with respect to the system 100 of FIG. 1.

Figure 3:
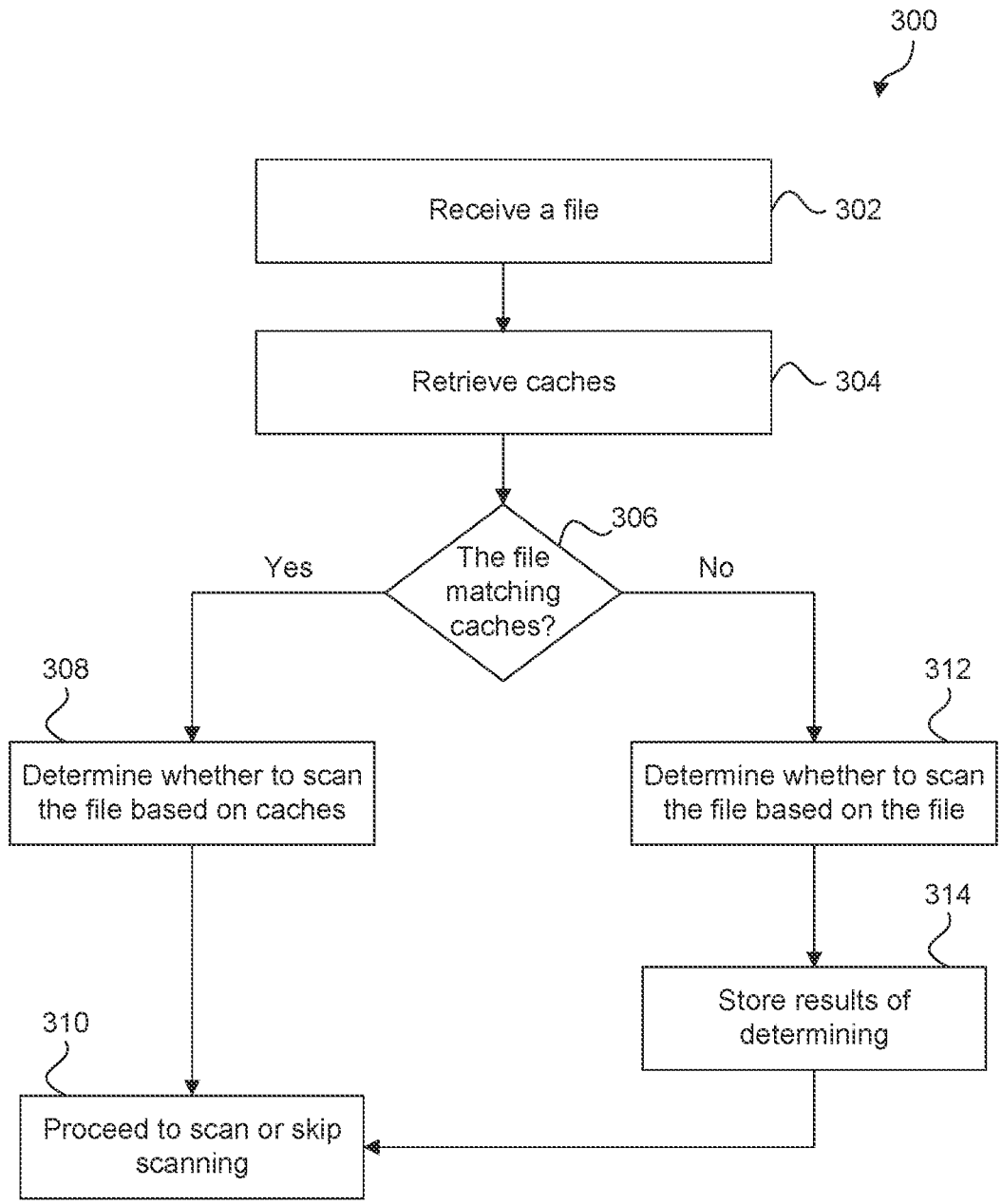
FIG. 3 illustrates an example method of analyzing a file, according to some embodiments of the disclosure.

FIG. 3 illustrates an example 300 method of analyzing a file, according to some embodiments of the disclosure. As a convenience and not a limitation. FIG. 3 may be described with regard to elements of FIGS. 1 and 6. The example method 300 may represent the operation of devices (e.g., the source code management system 102, the code analysis system 104, and the target platform 106 in FIG. 1) implementing code analysis. The example method 300 may also be performed by computer system 600 of FIG. 6. But the example method 300 is not limited to the specific embodiments depicted in those figures and other systems may be used to perform the method, as will be understood by those skilled in the art. It is to be appreciated that not all operations may be needed, and the operations may not be performed in the same order as shown in FIG. 3.

At 302, a code analysis system, such as the code analysis system 104 in FIG. 1, receives a file. In some embodiments, the code analysis system may receive the file from a code management system, such as the code management system 102 in FIG. 1. The code analysis system can receive the file wirelessly via a wireless channel or via a wired connection. The code analysis system can also receive the file via internal communication infrastructure, such as the communication infrastructure 240 in FIG. 2. For example, the code analysis system can be located in a same hardware device as the code management system. In some embodiments, the code analysis system may receive a list that indicates the file. For example, the list may be metadata of the file, which indicates a directory and/or identification of the file. The analysis system may pull the file from the code management system if the analysis system determines to scan the file as discussed below in 310 and FIG. 4. Otherwise, if the analysis system determines not to scan the file, as discussed below in 310 and FIG. 4, the analysis system may refrain from pulling the file from the code management system.

At 304, the code analysis system retrieves one or more cached data. In some embodiments, each of the one or more cached data indicates one or more files. For example, a cached data may include a list that indicates one or more file names. In such a case, the code analysis system may retrieve the one or more cached data based on a file name of the file. The one or more cached data may indicate the file name of the file or file names that are similar to the file name of the file. For another example, a cached data may include a list that indicates one or more file locations. In such a case, the code analysis system may retrieve the one or more cached data based on a file location of the file. The one or more cached data may indicate the file location of the file or file locations that are related to the file name of the file. Specifically, the file locations indicated by the one or more cached data may be parent or child folders of the file locations of the file. For yet another example, a cached data may include a list that indicates one or more file identifications (IDs). In such a case, the code analysis system may retrieve the one or more cached data based on an ID of the file.

At 306, the code analysis system determines whether the file matches the one or more cached data. In some embodiments, the one or more cached data may indicate the name of the file and thus match the file. The one or more cached data may also indicate the file location or the ID of the file and thus match the file. In some embodiments, the code analysis system may determine that the file does not match the one or more cached data even if the one or more cached data indicate one or more properties of the file. For example, the code analysis system may determine that the one or more cached data indicate the name of the file but also indicates file locations that are different from the file location of the file. In other words, not all properties indicated by the one or more cached data match the file. In such a case, the control moves to 312.

At 312, the code analysis system determines whether the file qualifies to skip scanning via static code analysis based on a type of the file and/or a file location of the file. For example, the code analysis system may determine to scan the file because the file is located in a source code directory indicating that the file includes source codes. For another example, the code analysis system may determine not to scan the file because the file is a text document. In such cases, the control moves to 314.

At 314, the code analysis system stores results of the determining at 312 in one or more cached data in the cache storage. In some embodiments, the code analysis system may add an entry that is associated with the file to the one or more cached data. The entry may indicate the file name, the file location, the ID, and/or other properties of the file. The entry may also indicate whether to scan the file based on the determination at 312. For example, if the code analysis system determines to scan the file, the entry can indicate that the file requires scanning. Otherwise, the entry can indicate not to scan the file.

At 310, the code analysis system proceeds to either scan or skip scanning. In some embodiments, if the code analysis system determines not to scan the file at 312, the code analysis system may refrain from scanning the file via the static code analysis. In other embodiments, if the code analysis system determines to scan the file at 312, the code analysis system may scan the file via the static code analysis.

Referring back to 306, the code analysis system may determine that the file matches the one or more cached data. For example, the code analysis system may determine that all properties of the file are indicated by the one or more cached data. For another example, the code analysis system may determine that a major property is indicated by the one or more cached data and thus the file matches the one or more cached data. The major property can be the ID of the file, which may be used to uniquely identify the file. Thus, even if file locations indicated by the one or more cached data do not match the file location of the file, the code analysis system may still determine that the file matches the one or more cached data. In such cases, the control moves to 308.

At 308, the code analysis system determines whether to scan the file based on the one or more cached data. In some embodiments, the code analysis system may determine that the one or more cached data indicate not to scan the file. For example, the one or more cached data may include an entry that was previously stored by the code analysis system or other devices, as discussed at 314. The entry may indicate the file name, the file location, the ID, and/or other properties of the file. The entry may also indicate not to scan the file. Otherwise, the entry may indicate that scanning is required for the file. In such cases, the control moves to 310 and the code analysis system can proceed based on the determination at 308.

In some embodiments, entries of cached data store file locations, matched rules discussed in 312, and check results discussed in 314. However, the matched rules of determining whether to scan a file based on the file, as described in 312 and further described in detail in FIG. 5 below, may change over time. For example, a file including source codes may no longer require scanning after the change of the rules. For another example, a text document may require scanning after the change of the rules. In some embodiments, the source code management system, such as the source code management system 102 in FIG. 1, may indicate to the code analysis system that the changes of the rules. Furthermore, the rules may have expiration periods. The code analysis system may determine that the rules have been changed when the expiration periods lapse. In such cases, the entries of the cached data are rendered invalid to maintain consistency. The code analysis system can perform the step 312 directly after 302 because the one or more cached data are no longer valid. In such a case, steps 304, 306, and 308 are skipped. On the other hand, the code analysis system can still perform the steps 304 and 306, but can determine that the file does not match the one or more cached data because they are invalid.

Figure 4:
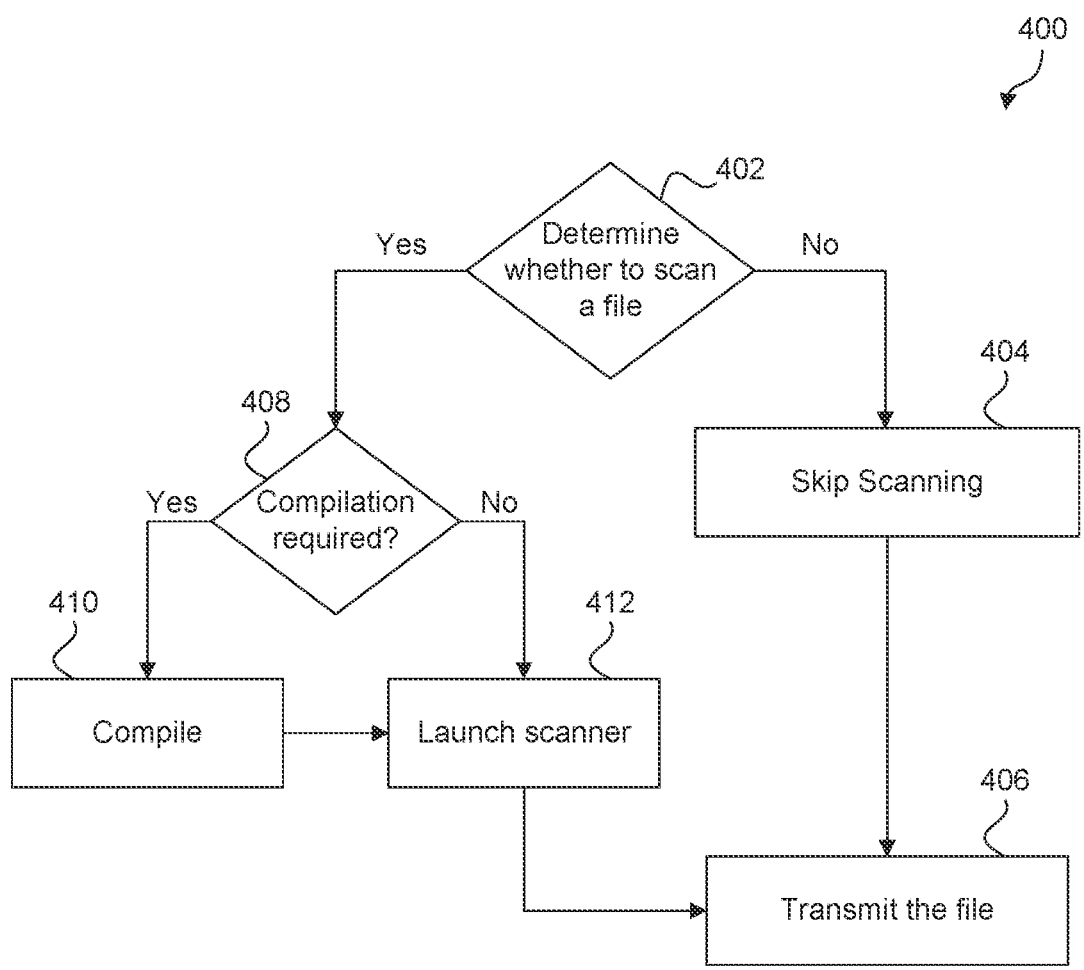
FIG. 4 illustrates an example method of scanning a file, according to some embodiments of the disclosure.

FIG. 4 illustrates an example method 400 of scanning a file via static code analysis, according to some embodiments of the disclosure. As a convenience and not a limitation, FIG. 4 may be described with regard to elements of FIGS. 1 and 6. The example method 400 may represent the operation of devices (e.g., the source code management system 102, the code analysis system 104, and the target platform 106 in FIG. 1) implementing the step 310 of FIG. 3. The example method 400 may also be performed by computer system 600 of FIG. 6. But the example method 400 is not limited to the specific embodiments depicted in those figures and other systems may be used to perform the method, as will be understood by those skilled in the art. It is to be appreciated that not all operations may be needed, and the operations may not be performed in the same order as shown in FIG. 4.

At 402, a code analysis system determines whether to scan a file via the static code analysis as described in 308 and 312 of FIG. 3. In some embodiments, the code analysis system may receive a list that indicates the file, not the actual file, as discussed above in FIGS. 1 and 302 of FIG. 3. In such a case, depending on whether to scan the file, the code analysis system determines whether to pull the actual file from a source code management system. For example, if the source code analysis system determines to scan the file, the source code analysis system can pull the actual file from the source code management system. Otherwise, the source code analysis system may determine not to pull the actual file. If the code analysis system determines to scan the file, the control moves to 408.

At 408, the code analysis system determines whether the file requires compilation. In some embodiments, the code analysis system may determine that the file requires compilation based on a type of the file. For example, the code analysis system may determine that the file includes source codes written in high-level programming languages, such as C, C++, Java, Python, or others and thus determine that the file requires compilation. In such a case, the control moves to 410.

At 410, the code analysis system compiles the file and the control moves to 412.

At 412, the code analysis system can launch a scanner. As discussed above, the scanner can be within the code analysis system or a remote location, such as in a cloud server. In such cases, the code analysis system can scan, using the scanner, the file to determine whether the file is error-free and has no potential weakness.

At 406, the code analysis system can transmit the file to another device or module, such as the target platform 106 in FIG. 1. In some embodiments, the code analysis system may transmit the file based on results of scanning at 412. For example, the code analysis system may transmit when the scanner determines that the file is error-free and has no potential weakness. Otherwise, the code analysis system may refrain from transmitting the file. In some embodiments, the code analysis system may send the file back to the scanner to scan again. The code analysis system may also flag the file and send it back to the source code management system, such as the source code management system 102 in FIG. 1. In some embodiments, instead of transmitting the file, the code analysis system can return the results of scanning at 412. For example, the code analysis system can output the results of scanning to a user. The code analysis system can display the results to the user or transmit the results to a device of the user. For another example, the code analysis system can transmit the results to another device, such as the source code management system 102 or the target platform 106 in FIG. 1. In such a case, the source code management system 102 can transmit the file to the target platform 106 based on the results. For example, the management system 102 may transmit the file to the target platform 106 when the results indicate that the file is error-free and has no potential weakness.

Referring back to 408, if the file does not require compilation, the control moves to 412. In such a case, the code analysis system does not need to compile and thus saves time and energy. In some embodiments, the code analysis system can determine whether the file requires compilation based on content of the file. For example, if the file includes source code that is written in a compiled language such as C, C++, and Objective-C, the file may require compilation. On the other hand, if the file includes source code written in interpreted languages such as Python, Ruby, and JavaScript, the file may not require compilation. In addition, if the file does not include any source code, the file may not require compilation.

Referring back to 402, if the code analysis system determines not to scan the file, the control moves to 404.

At 404, the code analysis system can skip scanning the file. For example, the code analysis system does not need to determine whether the file requires compilation as discussed in 408. The code analysis system also does not need to launch the scanner as discussed in 412. In some embodiments, if the code analysis system skips scanning the file at 404, the code analysis system may transmit the file without checking scanning results of the file. In other words, the file is pre-approved to proceed without scanning. In some aspects, the steps 402, 404, 406, 408, 410, and 412 discussed above can be used to process a plurality of files in batch. For example, the code analysis system can receive a plurality of files at 302 of FIG. 3. Thus, at 402, the code analysis system can determine that a subset of the plurality of files requires static code analysis. At 408, the code analysis system can determine files in the subset of the plurality of files that require compilation. For example, the code analysis system can determine that one or more files in the subset of the plurality of files require compilation and proceed to 410 to compile the one or more files of the subset of the plurality of files. The code analysis system can also determine that other files of the subset of the plurality of files do not require compilation. At 412, the code analysis system can launch the scanner to scan the one or more files of the subset of the plurality of files that are compiled at 410 and also scan the other files of the subset of the plurality of files that do not require compilation.

Figure 5:
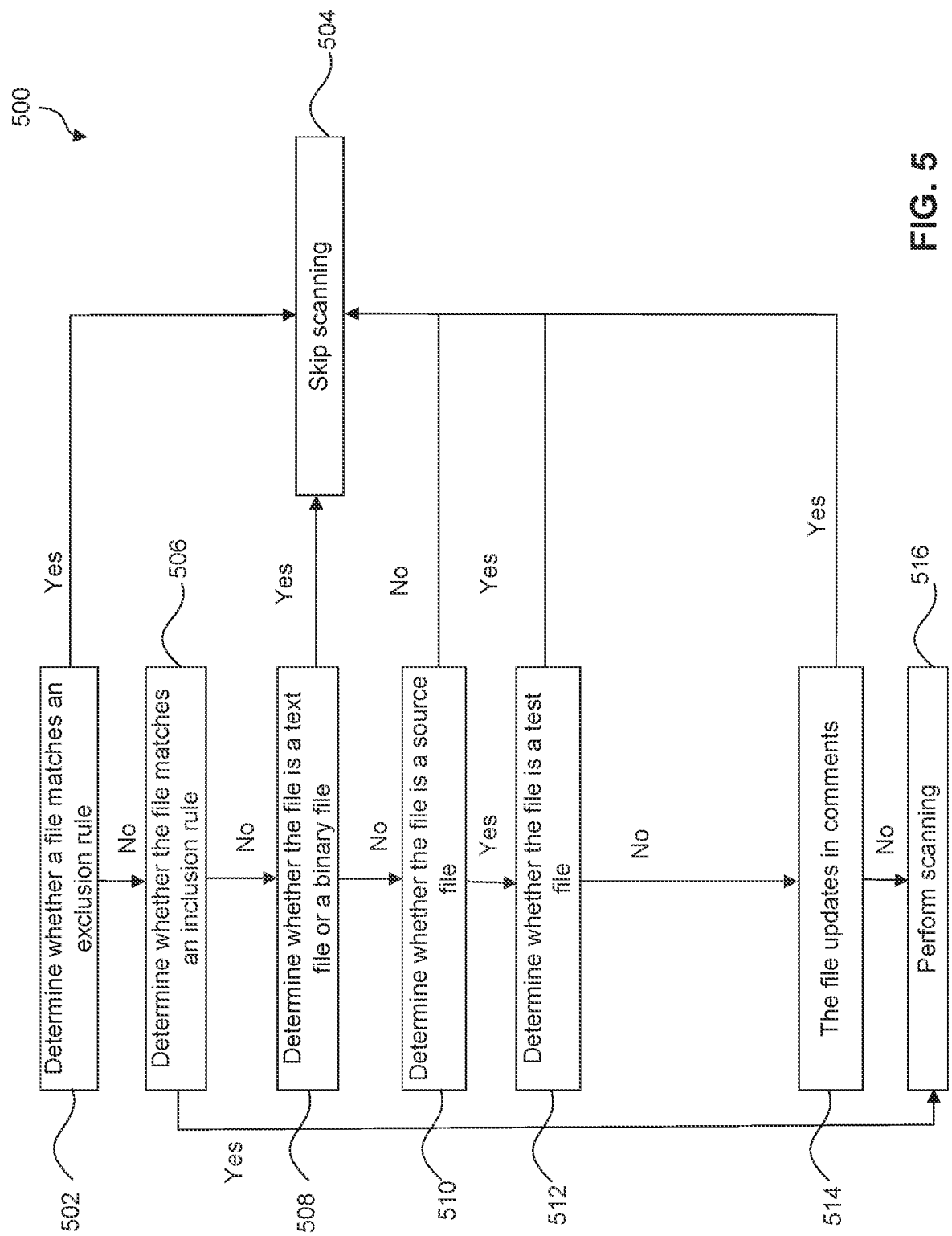
FIG. 5 illustrates an example method of determining whether to scan a file, according to embodiments of the disclosure.
Figure 6:
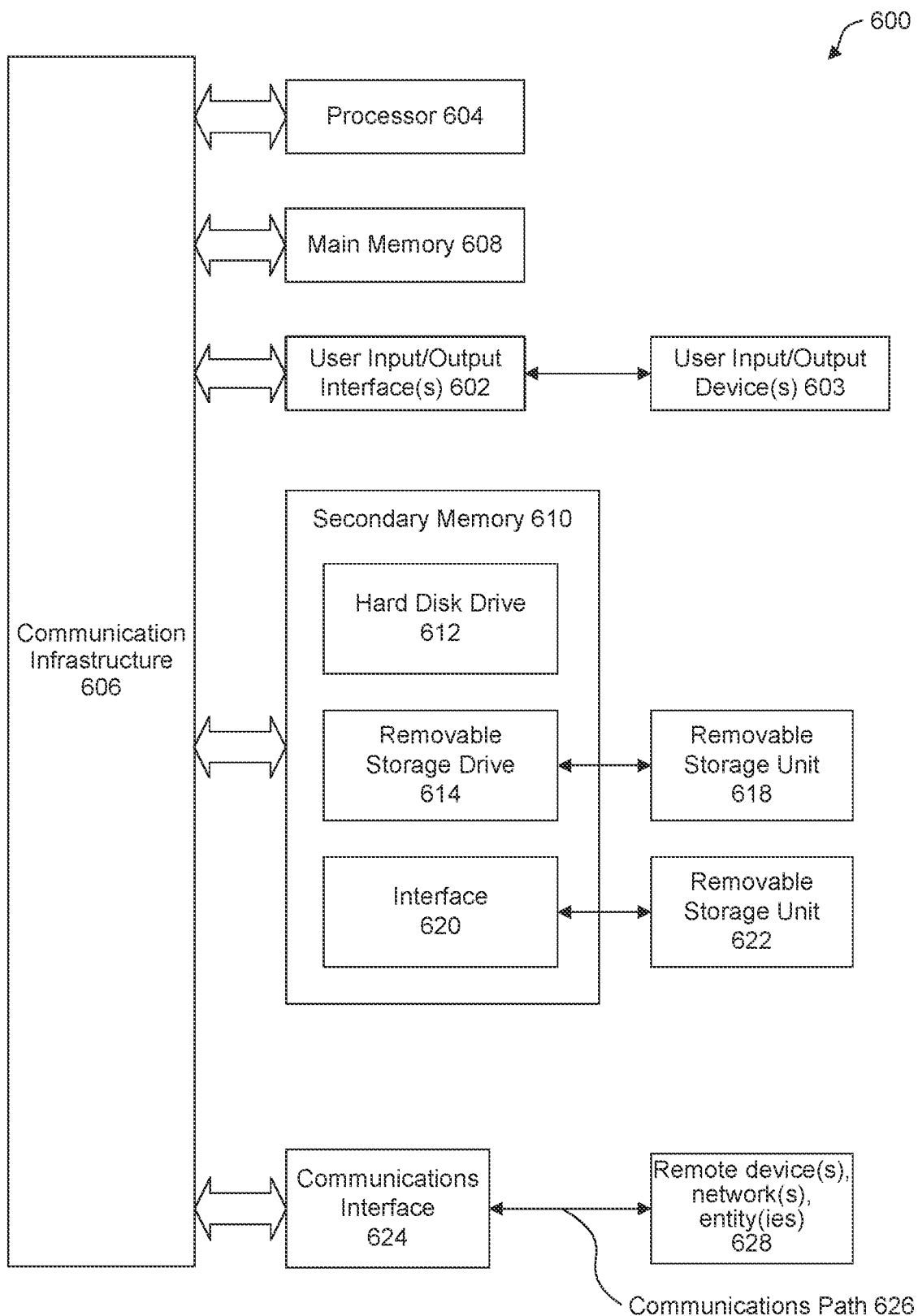
FIG. 6 is an example computer system for implementing some embodiments of the disclosure or portion(s) thereof.

FIG. 5 illustrates an example method 500 of determining whether to scan a file, according to embodiments of the disclosure. As a convenience and not a limitation, FIG. 5 may be described with regard to elements of FIGS. 1 and 6. The example method 500 may represent the operation of devices (e.g., the source code management system 102, the code analysis system 104, and the target platform 106 in FIG. 1) implementing the step 312 of FIG. 3. The example method 500 may also be performed by computer system 600 of FIG. 6. But the example method 500 is not limited to the specific embodiments depicted in those figures and other systems may be used to perform the method, as will be understood by those skilled in the art. It is to be appreciated that not all operations may be needed, and the operations may not be performed in the same order as shown in FIG. 5.

At 502, the code analysis system determines whether exclusion rules indicate whether to skip scanning a file. In some embodiments, the exclusion rules may be specified by users or system configurations. If an exclusion rule indicates skipping scanning the file, the control moves to 504 to skip scanning the file as further discussed below in 504. On the other hand, if the exclusion rules do not indicate the file or no exclusion rule is available, the control moves to 506.

At 506, the code analysis system determines whether inclusion rules indicate whether to scan a file. In some embodiments, the inclusion rules may be specified by users or system configurations. If an inclusion rule indicates scanning the file, the control moves to 518 to scan the file as further discussed below in 518. On the other hand, if the inclusion rules do not indicate the file or no inclusion rule is available, the control moves to 508.

At 508, a code analysis system determines whether the file is a text document or a binary file. In some embodiments, a text document may include natural language sentences or other contents that are not programming codes. The code analysis system can determine whether the file is a text document based on an extension of the file. For example, if the extension of the file is ".doc." ".md." ".txt." ".log," or other text document extensions, the code analysis system may determine that the file is a text document. In some embodiments, the code analysis system can also determine whether the file is a binary file based on the extension of the file. For example, the code analysis system may determine that the file is a binary file if the extension of the file is ".exe," ".dll," ".so," ".app," ".bin," and other binary file extensions. If the code analysis system determines that the file is a text document or a binary file, the control moves to 504 and the code analysis system may skip scanning the file as discussed in 404 of FIG. 4. If the code analysis system determines that the file is not a text document or a binary file, the control moves to 510.

At 510, the code analysis system determines whether the file is a source file. In some embodiments, the code analysis system may determine based on the file location of the file. The file location can be a path of the file in the source code management system 102. For example, the code analysis system may determine that the file location of the file is not a source file directory, such as an "src" directory. In such a case, the code analysis system may determine that the file is not a source file and the control moves to 504. Thus, the code analysis system may determine not to scan the file. On the other hand, if the file location of the file is a source file directory, the code analysis system determines that the file is a source file and the control moves to 512. In some embodiments, the code analysis system may determine not to scan the file even if the file is a source file. For example, the code analysis system may determine that the file location of the file is a source file directory and thus the file is a source file. However, the code analysis system may also determine that a source file is not supported by static code analysis. For example, the code analysis system may determine that the scanner, as discussed in FIG. 1 and FIG. 4, does not support a source file. For another example, the code analysis system can also determine that the source files are not supported by checking application programming interface (APIs) or official documents. In such cases, the control moves to 504 and the code analysis system may determine to skip scanning the file even if the file is a source file.

At 512, the code analysis system determines whether the file is a test file. In some embodiments, the code analysis system can determine based on at least one of four approaches. First, the code analysis system can determine based on the file name of the file. For example, the file name may include a term "test," such as "*test go," or a term "spec," such as "* spec.js." Second, the code analysis system can determine based on parent folders of the file. For example, the code analysis system may determine the file is a test file because parent folders of the file include "test" folder or "tests" folder. Third, the code analysis system can determine based on keywords of content of the files. For example, such keywords may include "tearUp" "teaDown," "describe, it, test." The code analysis system may determine the file including one or more of these keywords and thus is a test file. Fourth, the code analysis system can determine using machine learning (ML) or deep learning (DL) models trained to classify file types based on its content. If the code analysis system determines that the file is a test file, the control moves to 504 and the code analysis system skips scanning the file. Otherwise, the control moves to 514.

At 514, the code analysis system determines whether the file only updates comments from a previous version of the file. For example, the code analysis system can compare the file with its previous version and determine that the only differences are in comment sections, which have no impact on execution results of the file. The source code management system, such as the source code management system 102, can also indicate portions of update in the file when transmitting the file the code analysis system. If the code analysis system determines that the updates are only in comment sections, the control moves to 504 and the code analysis system skips scanning the file. Otherwise, the control moves to 516.

At 516, the code analysis system performs scanning as described in FIG. 4. In some embodiments, the steps 502, 506, 508, 510, 512, and 514 discusses determining whether to scan a file based on characteristics of the file, such as applied exclusion rules of the file discussed in 502, applied inclusion rules of the file discussed in 506, file types discussed in 508, 510, and 512, and changes made in the file discussed in 514. The code analysis system can use the characteristics described in steps 502, 506, 508, 510, 512, and 514 individually and separately to determine whether to skip scanning the file. For example, the code analysis system can apply 508 individually and determine to scan source files and skip scanning files that are not source files, even if the source files only update comments sections or are indicated in exclusion rules. The code analysis system can also use the conditions in other combinations that are different from FIG. 5.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702. One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM) Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack. XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
a memory; and
at least one processor coupled to the memory and configured to:
receive a plurality of files or metadata of the plurality of files;
identify a subset of the plurality of files that requires static code analysis based on one or more characteristics of the subset of the plurality of files;
determine that one or more files of the subset of the plurality of files require compilation;
compile the one or more files of the subset of the plurality of files;

perform the static code analysis on the compiled one or more files and other files of the subset of the plurality of files that require no compilation; and return results of the static code analysis.

2. The system of claim 1, wherein the at least one processor is further configured to receive the plurality of files or the metadata of the plurality of files from a source code management system.

3. The system of claim 1, wherein to identify the subset of the plurality of files that requires the static code analysis, the at least one processor is further configured to determine whether or not the subset of the plurality of files are text documents.

4. The system of claim 1, wherein to identify the subset of the plurality of files that requires the static code analysis, the at least one processor is further configured to determine whether or not the subset of the plurality of files are binary files.

5. The system of claim 1, wherein to identify the subset of the plurality of files that requires the static code analysis, the at least one processor is further configured to determine whether or not the subset of the plurality of files are stored in source file directories.

6. The system of claim 5, wherein the at least one processor is further configured to determine whether the static code analysis supports source files.

7. The system of claim 1, wherein to identify the subset of the plurality of files that requires the static code analysis, the at least one processor is further configured to determine whether or not the subset of the plurality of files are test files.

8. The system of claim 1, wherein the at least one processor is further configured to:
receive cached data associated with the plurality of files from a cache storage;
determine that the subset of the plurality of files does not match the cached data;
in response to determining that the subset of the plurality of files does not match the cached data, determine whether the subset of the plurality of files requires the static code analysis based on the one or more characteristics of the subset of the plurality of files; and
update the cached data based on results of the determining whether the subset of the plurality of files requires the static code analysis.

9. The system of claim 1, wherein the at least one processor is further configured to:
receive an additional file;
receive cached data associated with the additional file from a cache storage;
determine that the additional file matches the cached data;
determine that the additional file requires the static code analysis based on the cached data;
perform the static code analysis on the additional file; and
return results of the static code analysis.

10. A computer-implemented method for analyzing a plurality of files, comprising:
receiving, by one or more computing devices, the plurality of files or metadata of the plurality of files;
identifying, by the one or more computing devices, a subset of the plurality of files that requires static code analysis based on one or more characteristics of the subset of the plurality of files;
determining, by the one or more computing devices, that one or more files of the subset of the plurality of files require compilation;
compiling, by the one or more computing devices, the one or more files of the subset of the plurality of files;

performing, by the one or more computing devices, the static code analysis on the compiled one or more files and other files of the subset of the plurality of files that require no compilation; and
returning, by the one or more computing devices, results of the static code analysis.

11. The computer-implemented method of claim 10, further comprising receiving the plurality of files or the metadata of the plurality of files from a source code management system.

12. The computer-implemented method of claim 10, wherein the identifying the subset of the plurality of files that requires the static code analysis further comprises determining whether or not the subset of the plurality of files are text documents.

13. The computer-implemented method of claim 10, wherein the identifying the subset of the plurality of files that requires the static code analysis further comprises determining whether or not the subset of the plurality of files are binary files.

14. The computer-implemented method of claim 10, wherein the identifying the subset of the plurality of files that requires the static code analysis further comprises determining whether or not the subset of the plurality of files are stored in source file directories.

15. The computer-implemented method of claim 14, further comprises determining whether the static code analysis supports source files.

16. The computer-implemented method of claim 10, wherein the identifying the subset of the plurality of files that requires the static code analysis further comprises determining whether or not the subset of the plurality of files are test files.

17. A non-transitory computer-readable device having instructions stored thereon that, when executed by at least one computing device, cause the at least one computing device to perform operations to analyze a plurality of files, the operations comprising:
receiving the plurality of files or metadata of the plurality of files;
identifying a subset of the plurality of files that requires static code analysis based on one or more characteristics of the subset of the plurality of files;
determining that one or more files of the subset of the plurality of files require compilation;
compiling the one or more files of the subset of the plurality of files;
performing the static code analysis on the compiled one or more files and other files of the subset of the plurality of files that require no compilation; and
returning results of the static code analysis.

18. The non-transitory computer-readable device of claim 17, wherein the identifying the subset of the plurality of files that requires the static code analysis further comprises:
determining whether or not the subset of the plurality of files are text documents;
determining whether or not the subset of the plurality of files are binary files; or
determining whether or not the subset of the plurality of files are test files.

19. The non-transitory computer-readable device of claim 17, wherein the identifying the subset of the plurality of files that requires the static code analysis further comprises determining whether or not the subset of the plurality of files are stored in source file directories.

20. The non-transitory computer-readable device of claim 19, wherein the operations further comprise determining whether the static code analysis supports source files.

* * * * *